(12) United States Patent
Schreiber et al.

(10) Patent No.: US 8,136,836 B2
(45) Date of Patent: Mar. 20, 2012

(54) AIRBAG MODULE FOR A MOTOR VEHICLE

(75) Inventors: Christian Schreiber, Ahrensfelde (DE);
Patrick Isermann, Berlin (DE);
Paarthiban Purushothaman, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/966,979

(22) Filed: Dec. 13, 2010

(65) Prior Publication Data

US 2011/0079993 A1 Apr. 7, 2011

Related U.S. Application Data

(63) Continuation of application No. PCT/EP2009/060022, filed on Aug. 3, 2009.

(30) Foreign Application Priority Data

Aug. 6, 2008 (DE) .......................... 10 2008 036 515
Nov. 7, 2008 (DE) .......................... 10 2008 056 948

(51) Int. Cl.
B60R 21/26 (2011.01)
(52) U.S. Cl. .......................... 280/741; 280/736; 102/704
(58) Field of Classification Search .................. 280/736, 280/741; 102/704
See application file for complete search history.

(56) References Cited

U.S. PATENT DOCUMENTS

| | | | |
|---|---|---|---|
| 3,305,319 A * | 2/1967 | Perkins et al. ................. | 422/643 |
| 4,094,028 A * | 6/1978 | Fujiyama et al. ............... | 441/31 |
| 5,669,631 A | 9/1997 | Johnson et al. | |
| 6,076,468 A | 6/2000 | DiGiacomo et al. | |
| 6,196,583 B1 | 3/2001 | Ruckdeschel et al. | |
| 6,231,075 B1 | 5/2001 | Otsu | |
| 7,686,329 B2 | 3/2010 | Meissner et al. | |
| 7,690,680 B2 * | 4/2010 | Meissner et al. ............... | 280/736 |
| 7,896,393 B2 * | 3/2011 | Meissner et al. ............... | 280/736 |
| 2005/0082804 A1 | 4/2005 | Khandhadia | |
| 2009/0066067 A1 | 3/2009 | Meissner et al. | |

FOREIGN PATENT DOCUMENTS

DE 44 40 247 A1 5/1996
(Continued)

OTHER PUBLICATIONS

International Preliminary Reprt on Patentability in PCT/EP2009/060022 dated Feb. 17, 2011.
(Continued)

*Primary Examiner* — Drew Brown
(74) *Attorney, Agent, or Firm* — Foley & Lardner LLP

(57) ABSTRACT

The invention relates to an airbag module for a motor vehicle, comprising a gas sack, that can be inflated in order to protect a person by feeding gas into the gas sack, an openable reservoir for storing a coolant, wherein the reservoir comprises a first and a second portion, the second portion connected to the first portion, at least one outflow opening of the reservoir formed in the second portion, through which the coolant, for cooling the gas fed into the gas sack, can leave the reservoir, and a closure element for closing the outflow opening. According to the invention it is provided that the closure element divides the reservoir into the two portions, and that the coolant is arranged in the first portion, wherein the closure element seals the first portion of the reservoir with respect to the second portion of the reservoir. Further, the invention relates to a method for producing an airbag module.

16 Claims, 8 Drawing Sheets

FOREIGN PATENT DOCUMENTS

| | | |
|---|---|---|
| DE | 196 00 279 C1 | 6/1997 |
| DE | 196 18 028 A1 | 11/1997 |
| DE | 197 26 276 A1 | 12/1998 |
| DE | 197 26 296 A1 | 12/1998 |
| DE | 10 2006 010 953 A1 | 9/2007 |
| DE | 10 2007 037 604 A1 | 2/2009 |
| DE | 10 2008 010 740 B3 | 5/2009 |
| EP | 0 805 071 A2 | 4/1997 |
| EP | 0 913 299 A2 | 5/1999 |
| JP | 2007-508979 | 4/2007 |
| JP | 2009-511327 | 3/2009 |
| WO | WO-96/15012 | 3/1996 |
| WO | WO-2007/045227 A1 | 4/2007 |
| WO | WO 2007101644 A1 * | 9/2007 |
| WO | WO-2007/141335 A1 | 12/2007 |
| WO | WO-2009/019130 A1 | 2/2009 |

OTHER PUBLICATIONS

Office Action (Reason of Rejection) in JP Appln. No. 2011-501251 dated Mar. 8, 2011.

* cited by examiner

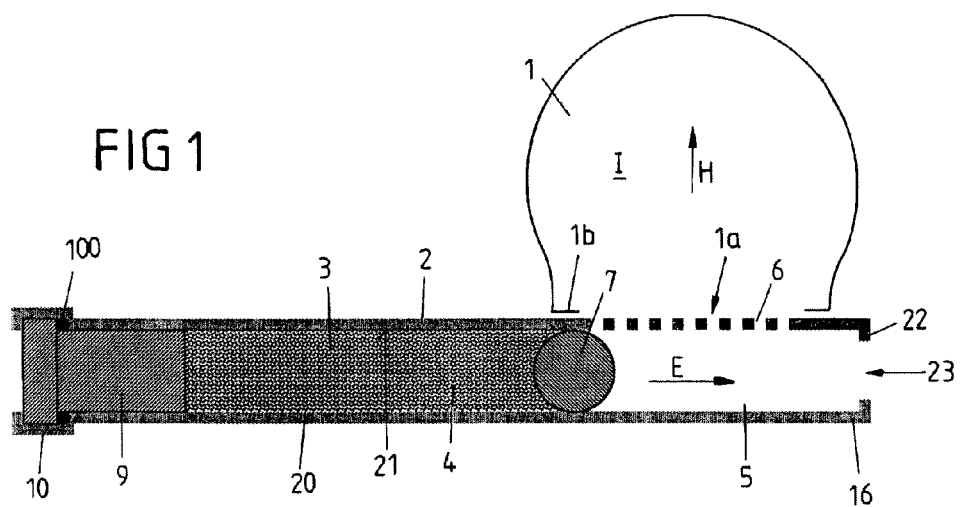
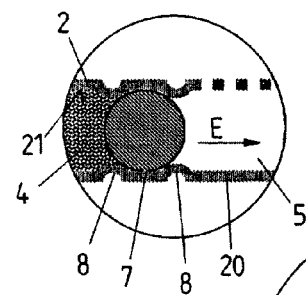
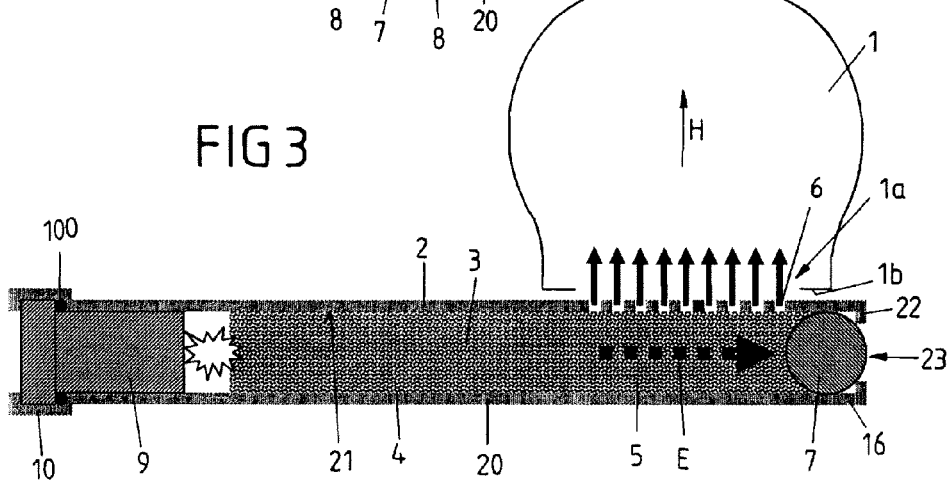

US 8,136,836 B2

AIRBAG MODULE FOR A MOTOR VEHICLE

CROSS-REFERENCE TO RELATED APPLICATIONS

This is a continuation of International Application PCT/EP2009/060022, which has an international filing date of Aug. 3, 2009; this International Application was not published in English, but was published in German as WO 2010/015595A1. The foregoing application is incorporated herein by reference in its entirety.

BACKGROUND

The invention relates to an airbag module for a motor vehicle as well as to a method for producing an airbag module.

Such an airbag module for a motor vehicle comprises a gas sack that can be inflated in order to protect an occupant by feeding gas into the gas sack, an openable reservoir for receiving a coolant, wherein the coolant is divided into a first and a second portion connected to the first portion, at least one outflow opening of the reservoir arranged in the second portion, through which coolant for cooling gas fed into the gas sack can get into the gas sack, and a closure element for closing the outflow opening, so that no coolant can leave of the reservoir.

By cooling the gas fed into the gas sack or residing in the gas sack, the pressure inside the gas sack can be decreased in a defined manner at an arbitrary time (particularly independently from the time of activation of the gas generator). Hereby, the gas sack can be adapted to specific crash conditions (collision conditions) or to the occupant that shall be protected, particularly to his size and weight as well as to his position with respect to the gas sack (e.g. out-of-position, i.e., outside the normal position during driving).

SUMMARY

It is therefore desirable is to improve an airbag module of the kind mentioned in the beginning.

One disclosed embodiment relates to an airbag module for a motor vehicle, comprising a gas sack, that can be inflated in order to protect a person by feeding gas into the gas sack, an openable reservoir for storing a coolant, wherein the reservoir comprises a first and a second portion, the second portion connected to the first portion, at least one outflow opening of the reservoir formed in the second portion, through which the coolant, for cooling the gas fed into the gas sack, can leave the reservoir, and a closure element for closing the outflow opening, wherein the closure element divides the reservoir into the two portions, and in that the coolant is arranged in the first portion, wherein the closure element seals the first portion of the reservoir with respect to the second portion of the reservoir.

Another disclosed embodiment relates Method for producing an airbag module, comprising the steps of: Providing a tube extending longitudinally along an extension direction, that is divided into a first and a second portion along the extension direction, forming at least one outflow opening merely at the second portion, and inserting a closure element into the tube, so that the closure element divides the tube into the first and the second portion.

It is to be understood that the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows a schematical cross sectional view of a reservoir of an airbag module according to the invention, which reservoir serves for storing a coolant that can be set free into the gas sack in order to decrease the pressure in the gas sack;

FIG. 2 shows a schematical cross sectional view of a detail of the reservoir shown in FIG. 1;

FIG. 3 shows the reservoir shown in FIG. 1 with an activated movement generating device for pressurizing the coolant with a gas;

DETAILED DESCRIPTION

Figure 4:
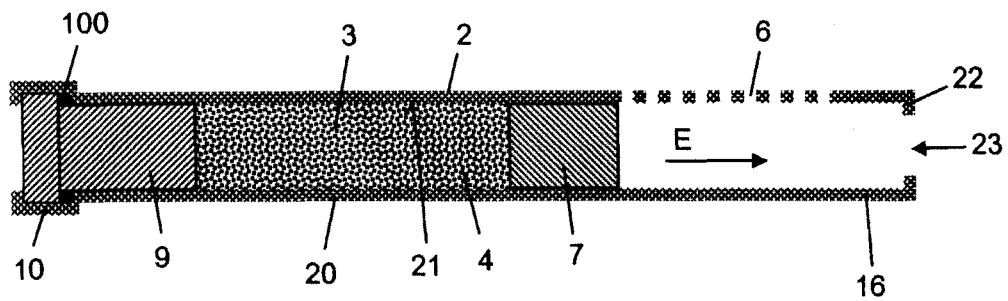
FIG. 4 shows a modification of the reservoir shown in FIG. 1 having a closure element in the form of a cylinder.

According to one aspect of the invention, it is provided that the (particularly moveable) closure element divides, in an initial position, the reservoir into the two portions, and that the coolant is arranged in the first portion, wherein the closure element can be configured and provided to seal the first portion of the reservoir with respect to the second portion of the reservoir. In this manner, the closure element closes the at least one outflow opening although it is particularly spaced apart from said at least one outflow opening.

Or in other words, the (particularly moveable) closure element is arranged at the side of the reservoir facing the at least one outflow opening and can be moved along this (in)side past the outflow opening, in order to open the outflow opening for setting free the coolant.

Further, the problem underlying the invention is solved by a method for producing an airbag module comprising the steps of providing a tube extending longitudinally along an extension direction, that is divided into a first and a second portion along the extension direction, forming at least one outflow opening merely at the second portion, and inserting a closure element into the tube, so that the closure element divides the tube into the first and the second portion.

Advantageous embodiments of the invention are described in the sub claims as well as in the Figures and the corresponding explanations. Thereby, a longitudinally extending shape of the reservoir means that the reservoir comprises a larger extension along an extension direction than along directions running across the extension direction. Thereby, the reservoir can comprise a curvature along the extension direction, so that it is formed arcuated or annular, for instance.

Particularly, the closure element is configured and provided to be moved in the reservoir for opening the outflow opening, wherein the closure element is also arranged at least in sections inside the reservoir in the opened state of the outflow opening.

In order to connect the at least one outflow opening in a fluid-conductive manner to the cooling liquid stored in the first portion of the reservoir, the closure element is particularly designed to be moved along a movement direction out of an initial position, in which the closure element divides the reservoir into the first and the second portion, into a final position, namely in particular away from the first portion and past the at least one outflow opening, so that the coolant can get from the first portion into the second portion of the reservoir and can escape from there through the at least one outflow opening out of the reservoir. I.e., upon this movement, the closure element traverses particularly the second portion of the reservoir, and is thus, in its final position, arranged in the second portion of the reservoir.

Particularly, the reservoir comprises a wall extending longitudinally along the movement direction, which wall circulates across the movement direction and surrounds the coolant, wherein said wall can be particularly formed hollow-cylindrical at least in sections.

Particularly, the wall comprises an inside facing the closure element (and the coolant), that circulates correspondingly across the movement direction. The closure element rests on this inside and glides along the latter during its movement into the final position.

Furthermore, the reservoir particularly comprises a front face, which faces the closure element along the movement direction, wherein said front face forms a stop for the closure element that delimits the movement of the closure element into the final position. Thereby, the front face particularly comprises a central through-opening which the closure element engages in the final position.

Particularly, the at least one outflow opening is formed at said wall, so that the closure element can be lead past the at least one outflow opening in a simple manner. Due to the afore-mentioned arrangement of the at least one outflow opening, the coolant is discharged out of the reservoir across the movement direction.

In a variant of the invention, the closure element is formed spherical, wherein the wall or the inside of the wall comprises a corresponding circular contour in cross section.

In order to lock the closure element in its initial position, the closure element is particularly prevented from being moved into the second portion by means of at least one bead circulating at the reservoir in the form of a protrusion circulating at the inside. For this, said bead is arranged along the movement direction between the closure element being in the initial position and the at least one outflow opening. The bead is a constriction of the reservoir, past which the closure element can only be moved, in case a certain, pre-definable minimal force acts on the closure element along the movement direction. Particularly, two such beads are provided, which are arranged on both sides of the closure element being in the initial position.

In order to ensure sealing of the first portion of the reservoir with respect to the second portion and in order that the closure element can be moved past the one bead, the closure element is designed (elastically) deformable in a variant of the invention. Alternatively, it is provided in a further variant of the invention, that the reservoir or the wall is designed (particularly elastically) deformable, whereas the closure element is particularly designed less deformable or rigid.

For moving the closure element out of the initial position into the final position, a movement generating device is particularly provided that is designed to act on the coolant with a pressure, so that the coolant presses the closure element out of the initial position into the final position. Further, the movement generating device can be configured and provided to provide a pressure in the first portion of the reservoir, so that the reservoir is widened in cross section. Hereby, locking of the closure element in the initial position can be released in case of a rigid closure element and the closure element can be moved into its final position. Particularly, the movement generating device is formed by a gas generator that is particularly clamped with a free end of the first portion of the reservoir.

Particularly, the reservoir is designed to extend longitudinally, particularly along the movement direction, wherein the reservoir is particularly designed tubular. In this connection, the reservoir can be indeed designed to have a curvature. The movement direction then follows said curvature or curvatures of the reservoir. In this way, the reservoir can be designed for instance to be ring-shaped in an open manner, particularly in case of a reservoir that is arranged or formed at a retaining element (e.g. diffuser) for a gas sack. Particularly, in case of a longitudinally extending reservoir, there is the possibility to pass the latter out of a module housing of the airbag module, in order to e.g. provide for an easily accessible interface between the movement generating device and an electronics on the vehicle side.

Particularly, the second portion of the reservoir is arranged such that coolant escaping out of the at least one outflow opening can flow through an inflow opening of the gas sack into the gas sack, in particular the second portion or even the whole reservoir can be arranged in an interior space of the gas sack defined by the gas sack.

In a variant of the invention it is provided that the reservoir is arranged at a retaining element of the airbag module that serves for fastening the gas sack to the airbag module, wherein the reservoir is particularly integrated into the retaining element, namely particularly by releasably (e.g. latching or screw connection) or non-releasably (e.g. welded connection) fixing it as a separate part to the retaining element or to a part of the retaining element. In an embodiment, the retaining element is designed as an annular circulating clamping ring that is configured and provided for clamping the gas sack to a part of the airbag module (e.g. to a module housing or to a gas generator). In another embodiment, said retaining element can also be formed by a diffuser for distributing gas set free by a gas generator. Such a diffuser particularly comprises a circulating flange to which the reservoir is fastened particularly as a separate part. The reservoir can also be an integral part that is formed in one piece with the flange or the retaining element.

Particularly, the reservoir can comprise a curvature, so that the reservoir protrudes, with a portion that comprises the movement generating device in particular, out of the gas sack, wherein said portion can run across the flange in particular. In this connection, the movement generating device can protrude at least in sections (or completely) out of the gas sack.

In a further embodiment of the invention, a further additional closure means is provided that can be moved out of an initial position, in which the further closure means is arranged such that the coolant is enclosed along the movement direction between the two closure means, into a final position, wherein the further closure means, upon moving into its final position, takes along the coolant and the one closure means, so that particularly on the one hand the one closure means is moved past the outflow openings (movement of the one closure means out of the initial position of the one closure means into the final position of the one closure means) and, on the other hand, the coolant can be set free particularly through the outflow openings into the interior space of the gas sack.

The further closure means can be formed like the one closure means and can be particularly locked in the same manner.

In this connection, the movement generating device is particularly configured and provided to act on the coolant with a pressure via the further closure means, so that the further closure means presses the coolant out of the reservoir and thereby carries the one closure means out of its initial position into its final position.

Furthermore, the problem according to the invention is solved by a method for producing an airbag module, particularly according to one of the claims 1 to 13. The problem according to the invention comprises the steps of: Providing a hollow body or tube extending longitudinally along an extension direction that is divided along the extension direction into a first and a second portion, forming at least one outflow opening merely at the second portion, and inserting a closure element into the hollow body or tube such that the closure element divides in this initial position the tube into the first and the second portion.

Particularly, as a closure element, an (elastically) deformable element (e.g. in the form of a sphere) is inserted into the tube, which closure element seals the first portion with respect to the second portion, so that coolant stored in the first portion cannot escape out of the at least one outflow opening formed at the second portion, or a rigid element is provided as a closure element and the reservoir is formed deformable or elastically deformable. Thus, upon acting on the coolant with a pressure, either the contact pressure of the elastically deformable closure element on the wall of the reservoir is surmounted, so that it can be moved out of the initial position into the final position, or the reservoir is widened in cross section due to the provided pressure, so that a rigid (less deformable) closure element can be pressed out of the initial position into the final position.

For fixing the movement generating device, particularly a free end of the first portion is widened in cross section along a cross section plane running across the extension direction of the tube.

In order to further avoid that the closure element can be pressed out of the tube (the second portion) along the extension direction of the tube (movement direction), a free end of the second portion, that faces the free end of the first portion along the extension direction, is narrowed in cross section.

The first portion of the tube or reservoir particularly serves as a receptacle for the coolant and is therefore filled through an opening of the first section, which opening is delimited by the free end of the first portion, with said coolant.

In an embodiment of the method according to the invention it is provided that a further closure means is arranged in the first section, particularly through an opening of the first portion, which opening is delimited by the free end of the first portion, wherein the two closure means enclose the coolant along the movement direction. Thus, the further closure means serves as a piston that can be acted on with a pressure, which piston correspondingly presses the coolant out of the reservoir and thereby presses the one closure means being opposite along the movement direction out of its initial position into its final position in a way (via the cooling liquid as a force mediator), that the one closure means is moved past the outflow openings and therefore frees said outflow openings for exhausting the coolant.

The said movement generating device is particularly arranged through the opening of the first portion in the first portion of the tube (and thereafter particularly fixed in the tube), wherein particularly the free end of the first portion, which free end delimits said opening of the first portion, is clamped with the movement generating device in order to fasten the movement generating device in the reservoir, so that said free end of the first portion of the reservoir tightly encompasses and particularly engages behind the movement generating device, so that the movement generating device cannot be pulled out of the reservoir just like that opposite to the movement direction of the closure element.

FIG. 1 shows a schematical cross sectional view of a reservoir 2 of an airbag module according to the invention, which reservoir 2 serves for storing a coolant 3 that can be set free through a plurality of outflow openings 6, that are formed at a longitudinally extending circulating wall 20 of the reservoir 2, into an interior space I surrounded by a gas sack 1, in order to cool gas residing therein that serves for inflating the gas sack 1. Hereby, the pressure inside the gas sack 1 is decreased according to well-established laws of physics. In this connection, said outflow openings 6 can be suitably arranged with respect to an inflow opening 1a of the gas sack 1 or directly in the interior space I of the gas sack 1. Further, there is the possibility to arrange the whole reservoir 2 in said interior space I of the gas sack 1.

A movement generating device 9 in the form of a gas generator is arranged in the reservoir 2, which movement generating device 9 is designed to act on the coolant 3 residing in the reservoir 2 with a pressure, so that this is set free through said outflow openings 6 into the interior space I of the gas sack 1. Thereby, the movement generating device 9 can be activated at an arbitrary time, particularly independently of the time of activation of the gas generator by means of which the gas needed to inflate the gas sack 1 is provided. Particularly, the coolant 3 stored in the reservoir 2 (e.g. cooling liquid, particularly water) can be set free into the interior space I of the gas sack 1 and brought into contact with the gas during or after inflation of the gas sack 1.

Particularly, a control electronics for controlling or activating the movement generating device 9 is provided, wherein said control electronics calculates the time of activation of the movement generating device 9 (or the time of setting free the coolant 3) depending on at least one parameter that can be detected by at least one sensor that can be arranged in or at a motor vehicle. Particularly, such a parameter can be a deceleration of the motor vehicle, the size of the occupant to be protected or his mass, as well as his position with respect to the gas sack. Hereby, the gas sack 1 can be particularly adapted to a so-called "out-of-position"-case in which the occupant is positioned too close to the gas sack, particularly with his head, and therefore, a corresponding risk of injury exists.

In order that the coolant 3 cannot escape through the outflow openings 6 of the reservoir 2 out of the reservoir 2 before the activation of the movement generating device 9, a closure element 7 is provided that is arranged spaced apart with respect to the outflow openings 6 in the reservoir 2 and thereby divides the reservoir 2 in a first portion 4 and a second portion 5, such that coolant 3 residing in the first portion 4 cannot get past the closure element 7 into the second portion 5 at which the outflow openings 6 are formed. The closure element 7 is thus arranged along the reservoir 2 between the coolant 3 and the outflow openings 6 (initial position). In order to assure the sealing between the first portion 4 and the second portion 5, the outer diameter of the closure element 7 is provided with an oversize compared to the inner diameter of the wall 20. This means, that the closure element 7 has to be elastically deformed for housing in the reservoir 2, and thus, in the mounted state, butts against the inside 21 of the wall 20 with a certain contact pressure. Thereby, the contact pressure is determined by the amount of the oversize. The closure element 7 can be moved out of the initial position along a movement direction E that runs along the extension direction of the reservoir 2 by acting on the coolant 3 that is stored in the first portion 1 of the reservoir 2 with a pressure by means of the movement generating device 9.

For this, the movement generating device 9 is arranged at a free end 10 of the first portion 4 of the reservoir 2, which free end 10 faces the closure element 7 along the movement direction E. If the coolant 3 stored in the first portion 4 of the reservoir 2 is now acted on with a pressure by means of the movement generating device 9, said closure element 7 is also acted on with said pressure and therefore moves along the movement direction E away from the movement generating device 9 towards the second portion 5 of the reservoir 2, namely such that it glides in the reservoir 2 past the outflow openings 6 and thereby traverses the second portion 5 of the reservoir 2. A front face 22 of the reservoir 2 at a free end 16 of the second portion 5 of the reservoir 2, which front face 22 faces the free end 10, thereby forms a stop for the closure element 7 that delimits the movement of the closure element 7 along the movement direction into the final position. As soon as the closure element 7 hits said front face 22 of the reservoir 2, it resides in its final position in which it has been completely moved past the outflow openings 6 along the movement direction E. Now, the coolant 3 can get out of the first portion 4, due to the pressure acting on the coolant 3, into the second portion 5 of the reservoir 2 and can be set free from there through the outflow openings 6 into the interior space I of the gas sack 1. The closure element 7 is thus always arranged inside the reservoir 2 and does not leave the latter. However, a through-opening 23 can be provided at the front face 22, into which the closure element 7 can project into its final position. This through-opening can be provided for reasons of manufacturing (see below).

For locking the closure element 7 in its initial position such that it cannot be moved unintendedly out of this initial position, two beads 8 circulating across the movement direction E can be provided in addition to the afore-described fixation by means of the elastic deformation of the closure element 7, which beads 8 protrude from an inside 21 of the wall 20 facing the closure element 7 into the reservoir 2 and are arranged along the movement direction E on both sides of the closure element 7, so that on both sides of the closure element 7 the cross section of the reservoir 2 is narrowed in a plane being oriented perpendicular to the movement direction E and therefore the closure element 7 is held in the initial position between these two beads 8 along the movement direction E. Thus, a certain pre-definable minimum force has to act on the closure element 7, in order to move it out of this initial position along the movement direction E into its final position. In this connection, the closure element 7 can be designed deformable or elastically deformable or the closure element 7 can be a rigid closure element, e.g. a steel sphere, wherein in such a case the reservoir 2 or the wall 20 can itself be designed deformable or elastically deformable, so that the closure element 7 can be forced past the bead 8 arranged between the closure element 7 and the outflow openings 6 along the movement direction E, when the movement generating device 9 acts on the coolant 3 with a pressure, in order to displace the closure element 7 along the movement direction E into its final position (cf. FIG. 3).

FIG. 4 shows on the basis of a schematical cross sectional view a modification of the reservoir 2 shown in FIG. 1, in case of which, in contrast to FIG. 1, the closure element 7 is not spherical, but designed in the form of a cylinder, particularly in the form of a circular cylinder.

Figure 5:
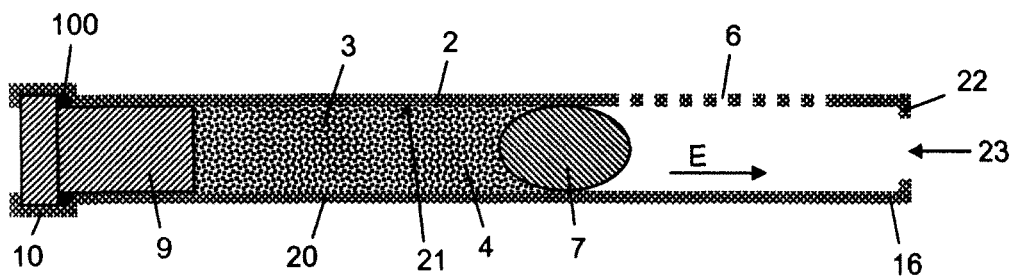
FIG. 5 shows a modification of the reservoir shown in FIG. 1 having a closure element in the form of an ellipsoid.

FIG. 5 shows in a schematical cross sectional view a modification of the reservoir 2 shown in FIG. 1, in case of which, in contrast to FIG. 1, the closure element 7 is not spherical, but designed in the form of a flattened sphere, particularly in the form of an ellipsoid.

Figure 6:
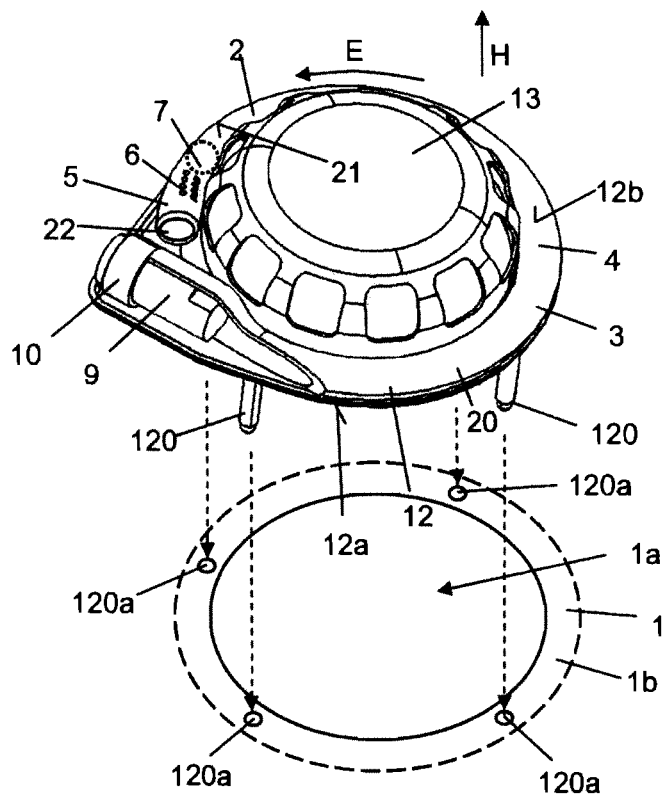
FIG. 6 shows an embodiment of an airbag module according to the invention in the form of a driver airbag module in case of which the reservoir is formed to circulate.

FIG. 6 shows a diffuser 13 of an airbag module according to the invention with a part of a gas sack 1 in an exploded view, wherein said diffuser 13 is formed cap-shaped and comprises an annularly circulating flange 12 for fixing to a module housing of an airbag module, from which flange 12 bolts 120 protrude that are configured and provided to engage through-openings of a module housing or another part of an airbag module for fastening the diffuser 13 to said airbag module. Particularly, said bolts 120 protrude counter to a main unfolding direction H of the gas sack 1, along which the gas sack 1 unfolds towards an occupant to be protected upon inflation.

Thereby, the flange 12 rests from the interior space I of the gas sack 1 with a lower side 12a facing the gas sack on a boundary region 1b delimiting the inflow opening 1a of the gas sack 1, so that said boundary region 1b, upon fastening the diffuser 13 to the airbag module, particularly to a module housing of the airbag module, is clamped between the flange 12 and said part of the airbag module. The boundary region 1b of the inflow opening 1a of the gas sack thereby comprises through-openings 120a that are each engaged by a bolt 120.

A reservoir 2 is arranged at the flange 12 in the manner of FIG. 1, which reservoir 2 annularly circulates in an open manner at an upper side 12b of the flange 12 of the diffuser 13 facing away from the boundary region 1b, so that the movement generating device 9 provided at the free end 10 of the first portion 4 of the reservoir 2 is arranged adjacent to the free end 16 of the second portion 5 of the reservoir 2, at which free end 16 said front face 22 having an optional through opening 23 is formed. The outflow openings 6 of the reservoir 2 are thereby arranged at the wall 20 of the reservoir 2 in a way, that they face away from the boundary region 1b of the inflow opening 1a of the gas sack 1 or face the interior space I of the gas sack 1, so that the coolant 3 set free out of the reservoir 2 through the outflow openings 6 can be set free into the interior space I of the gas sack 1 on the shortest route. Particularly, the reservoir 2 according to FIG. 6, as a separate part, is releasably fixed (e.g. latching or screw connection) or non-releasably (e.g. rivet or welded connection) to the flange 12.

Of course, it is also possible to form the reservoir 2 in one piece with said flange 12, wherein particularly the wall 20 or the reservoir 2 can form said flange 12 by itself. In this case, the bolts 120 are fixed directly to the wall 20 or the reservoir 2.

Figure 7:
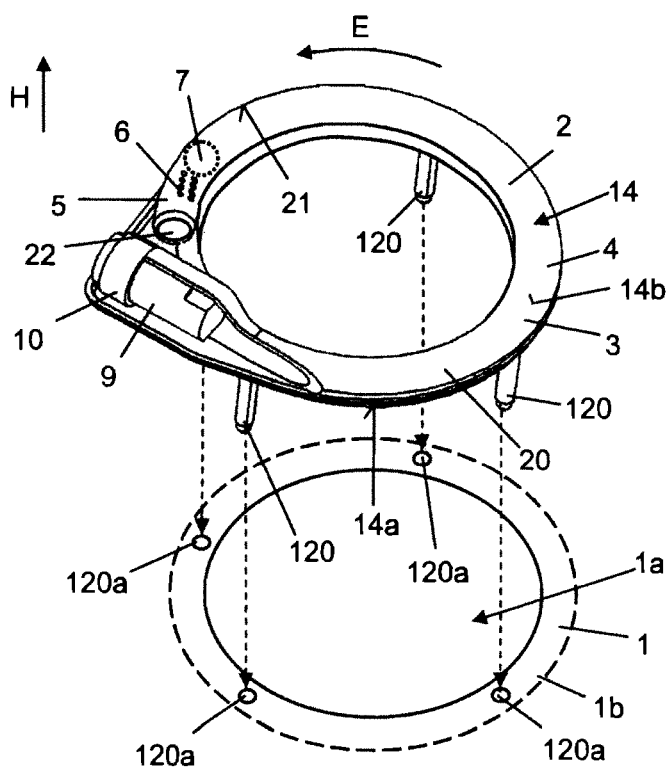
FIG. 7 shows a modification of the airbag module shown in FIG. 6.

FIG. 7 shows on the basis of a schematical, perspective view a modification of the reservoir 2 shown in FIG. 6, wherein said reservoir 2, in contrast to FIG. 6, is not formed at a flange 12 of a diffuser 13, but at an annularly circulating clamping element 14 for the gas sack 1, from which said bolts 120 protrude counter to said main unfolding direction H for fixing the clamping element to an airbag module, particularly to an airbag module housing. Thereby, the clamping element 14 serves for clamping said boundary region 1b of the gas sack 1 that delimits and circulates the inflow opening 1a of the gas sack 1 to a part of the airbag module, particularly to an airbag module housing. In this connection, the clamping element 14 presses, like the flange 12 according to FIG. 6 before, from the interior space I of the gas sack 1 against the boundary region 1*b* of the inflow opening 1*a*, namely against an inside of said boundary region 1*b* facing the interior space I.

Particularly, the reservoir 2 is fixed to the circulating clamping element 14 as a separate part and annularly circulates in an open manner along the clamping element 14, so that the free end 10 with the movement generating device 9 fixed thereto is arranged adjacent to the front face 22 or the free end 16 of the second portion 5 of the reservoir 2. Regarding possible kinds of connection between the reservoir 2 and the clamping element 14, it is referred to the explanations with respect to FIG. 6.

Further, there is also the possibility to form the reservoir 2 in one piece with the circulating clamping element 14. According to FIG. 6, the reservoir 2 can form said clamping element 14 by itself, wherein in this case the bolts 120 are directly fixed to a lower side of the reservoir 2 facing the boundary region 1*b* of the gas sack 1.

The two variants according to FIG. 6 and FIG. 7 are particularly given by a diffuser 13 or a clamping element 14 for a driver airbag module. Provided that the reservoir 2 is releasably fastened to the flange 12 of the diffuser or to the circulating clamping element (clamping ring) 14, there exists, with advantage, the possibility, to upgrade a usual driver airbag module with such a reservoir 2 of an airbag module according to the invention.

Figure 8:
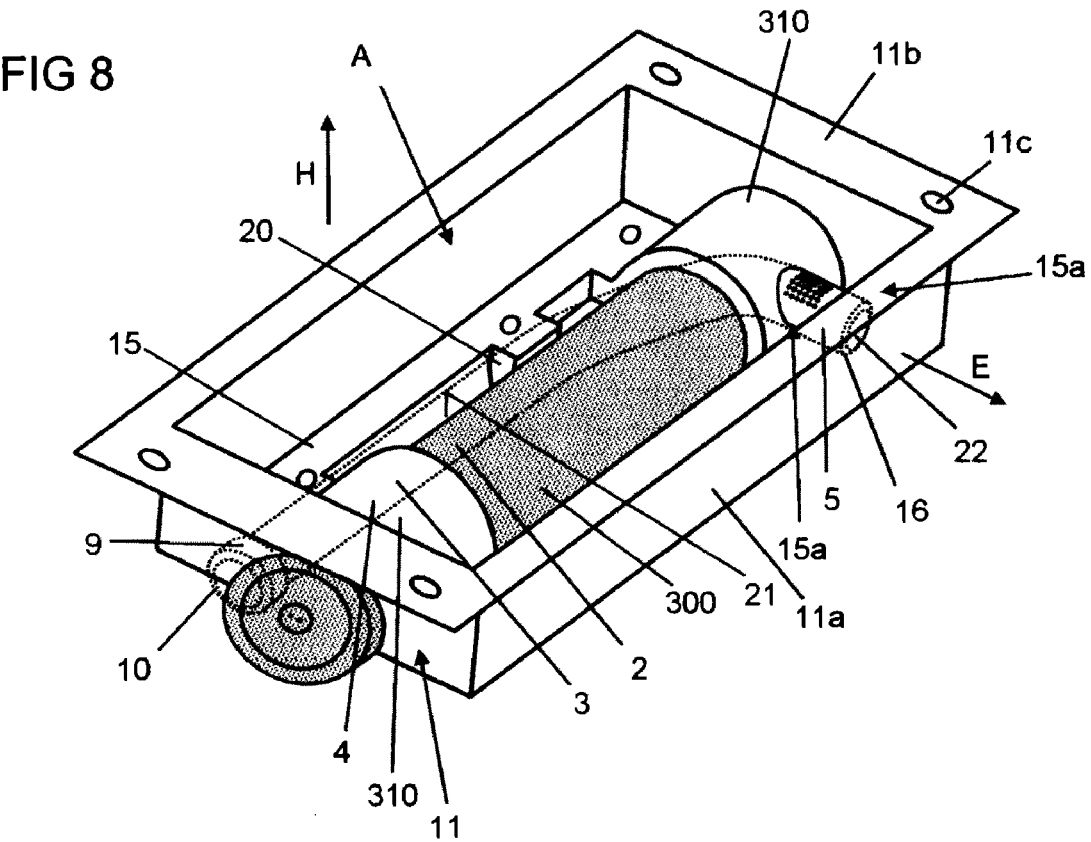
FIG. 8 shows a further embodiment of an airbag module according to the invention in the form of a co-driver airbag module.
Figure 9:
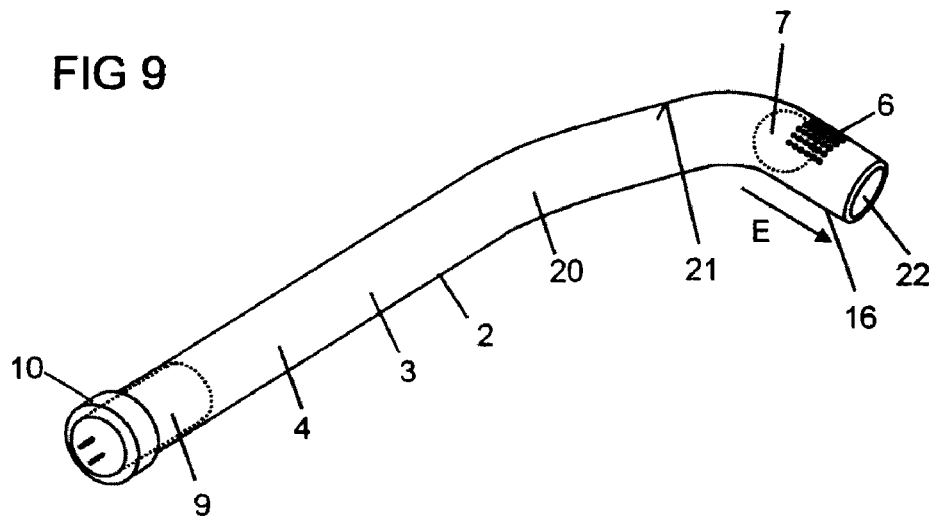
FIG. 9 shows a detail of FIG. 8.

FIG. 8 shows in connection with FIG. 9 a schematical, perspective view of an airbag module in the form of a co-driver airbag module having a rectangular module housing 11 that forms a receptacle A for a folded (not inflated) gas sack 1 (not shown in FIG. 8), wherein said module housing 11 comprises a flat bottom 15 that serves for clamping a boundary region 1*b* delimiting an inflow opening 1*a* of the gas sack 1. This can take place by means of a clamping element mentioned in connection with the description of FIG. 7 that was adapted correspondingly. From the bottom 15, a wall 11*a* protrudes along a main unfolding direction H, along which the gas sack arranged in the receptacle A unfolds towards the occupant or co-driver to be protected, which wall 11*a* circulates across the main unfolding direction H and has a boundary region 11*a* coming off therefrom across the main unfolding direction H, via which boundary region 1*b* the module housing 11 can be fixed to a motor vehicle part. For this, through-openings 11*c* are provided at said boundary region 11*b* of the module housing 11 that can be engaged by suitable fastening means, for example screws. The mentioned motor vehicle part can be an instrument panel of a motor vehicle in particular.

The bottom 15 of the module housing 11 comprises a trough-shaped indentation 20 in which a gas generator 300 can be arranged that serves for inflating the gas sack 1 that is to be arranged in the receptacle A. On both sides of the trough-shaped indentation 20, barrel-shaped protrusions 310 are arranged that partly surround the gas generator 300 in the main unfolding direction H, i.e., circulate across the main unfolding direction H at least in sections, and are overlapped by a part of the boundary region 1*b* delimiting the inflow opening 1*a* of the gas sack 1. For cooling the gases fed into this gas sack 1*a* coolant 3 stored in a reservoir 2 is provided, wherein said reservoir 2 comprises according to the manner of FIG. 1 a first portion 4 and a second portion 5, wherein said coolant 3 is provided in the first portion 4 and the at least one outflow opening 6 for exhausting the coolant 3 in the second portion 5 of the reservoir 2. Said two portions 4, 5 are thereby sealingly separated from each other by a closure element 7 according to the manner of FIG. 1, wherein said closure element 7 can be moved in the afore-described manner by means of a movement generating device 9 that is provided at a free end 10 of the first portion 4 of the reservoir 2 along a movement direction E past the outflow openings 6 into a final position in which the closure element 7 is arranged according to FIG. 3 at a free end 16 of the second portion 5 or at a front face 22 of the reservoir 2 formed at this position.

According to FIG. 9, this reservoir 2 comprises a curvature, so that the second portion 5, at which said outflow openings 6 are formed, runs essentially across the first portion 4 of the reservoir 2 in which the coolant 3 is stored. Thereby, the second portion 5 protrudes according to FIG. 8 with its outflow openings 6 through a through-opening 15*a* provided in a barrel-shaped protrusion 310 into the receptacle A delimited by the module housing 11 in a way, that the outflow openings 6 face along the main unfolding direction H an inflow opening of the gas sack that is to be arranged in the receptacle A. Thus, coolant 3 set free through the outflow openings 6 can be set free directly into an interior space of said gas sack as described above.

For electrically contacting the movement generating device 9, also the free end 10 of the first portion 4 of the reservoir 2, to which free end 10 the movement generating device 9 is particularly fixed, protrudes out of the module housing 11.

Figure 10:
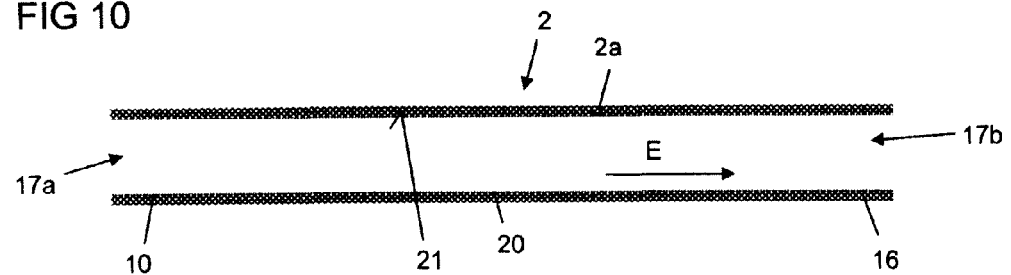
FIG. 10-17 show a sequence of schematical cross sectional views of a reservoir of an airbag module according to the invention during the production of the reservoir/airbag module.

FIG. 10 shows in connection with the FIGS. 11 to 17 on the basis of schematical cross sectional views the production of a reservoir 2 according to the manner of FIG. 1. The production of the other variants of the reservoir 2 proceeds in an analogous fashion.

First, as a base piece of the reservoir 2, a tube 2*a* longitudinally extending along the later movement direction E having a certain length and curvature (optional) is provided, wherein said tube 2*a* comprises a wall 20 longitudinally extending along the later movement direction E that circulates across said movement direction E (thus, the movement direction E coincides with the extension direction of the tube 2*a* or of the reservoir 2). Depending on the geometry of the closure element 7, this wall 20 comprises in a cross sectional plane running across the movement direction E corresponding dimensions. Said tube 2*a* comprises two free ends 10, 16 that face each other along the movement direction E and delimit an opening 17*a*, 18*b*, respectively.

Figure 11:
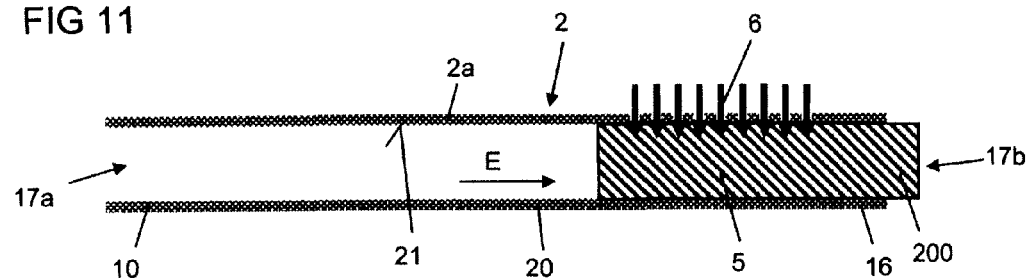

After providing said tube 2*a*, a plurality of outflow openings 6 is formed according to FIG. 11 at a second portion 5 of the tube 2*a* that comprises the free end 16 of the tube 2*a*. These can be stamped into the tube 2*a*, wherefore a counter bearing element 200 is form-fittedly inserted (counter to the movement direction E) into the tube 2*a* through the opening 17*b* formed at the free end 16 of the second portion 5, so that the tube 2*a* does not experience an indentation, when the outflow openings 6 are stamped into the second portion 5 of the tube 2*a*.

Figure 12:
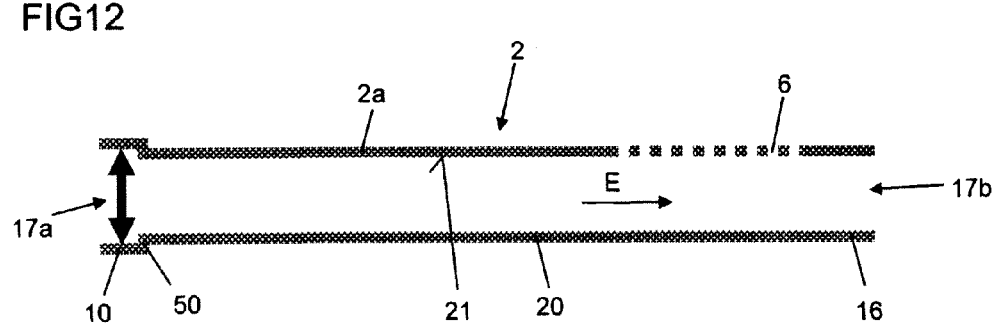

Hereafter, a widening is formed according to FIG. 12 at a further free end 10 of a first portion 4 of the tube 2*a* connected to the second portion 5, which free end 10 faces the outflow openings 6 or the free end 16 of the second portion 5 of the tube 2*a* along the movement direction E, so that said free end 10 obtains a step 50 that circulates across the movement direction E and thereby extends flatly annularly along a plane running across the movement direction E.

Figure 13:
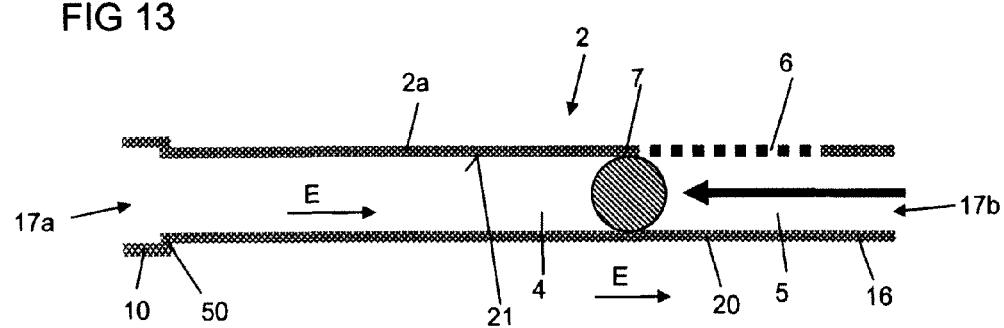
Figure 14:
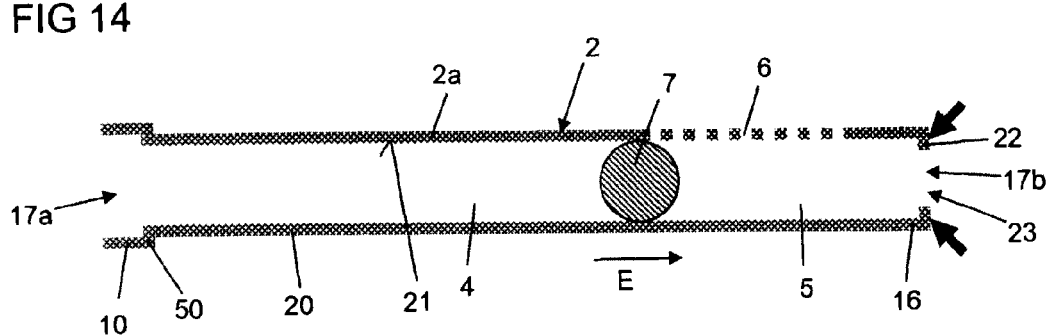

Then, according to FIG. 13, a closure element 7 in the form of a sphere (other shapes are also possible) is brought (pressed-in) into the tube 2*a* through the opening 17*b* of the free end 16 of the second portion 5 of the tube 2*a*, namely in an initial position in which the closure element 7 sealingly separates the second portion 5 from the first portion 4 of the tube 2a. Hereafter, according to FIG. 14, the free end 16 of the second portion 5 is narrowed, namely by means of folding (flanging) said free end.

Figure 15:
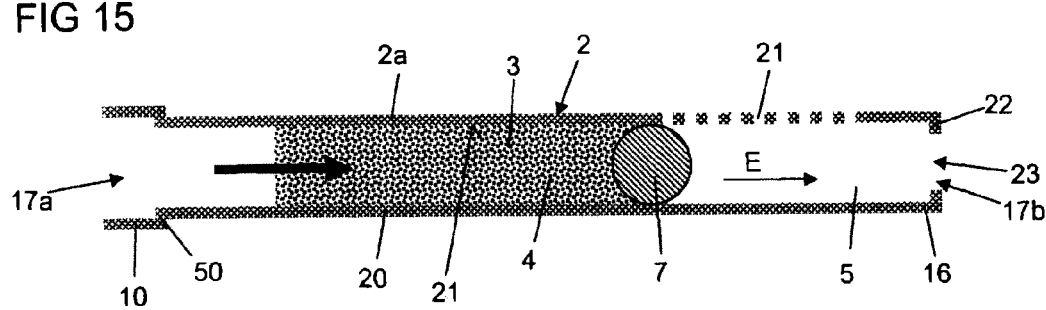
Figure 16:
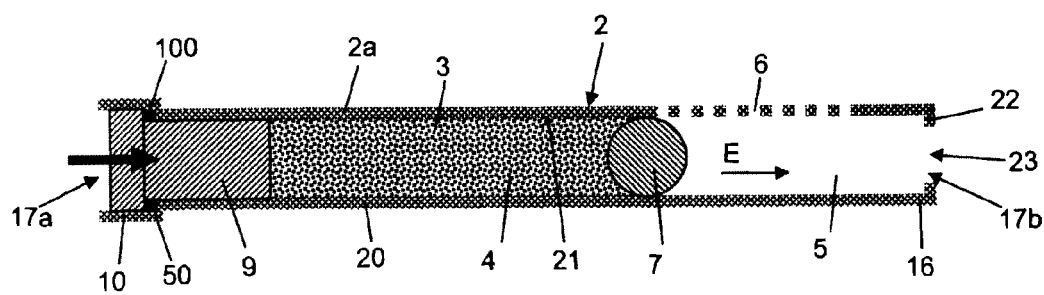
Figure 17:
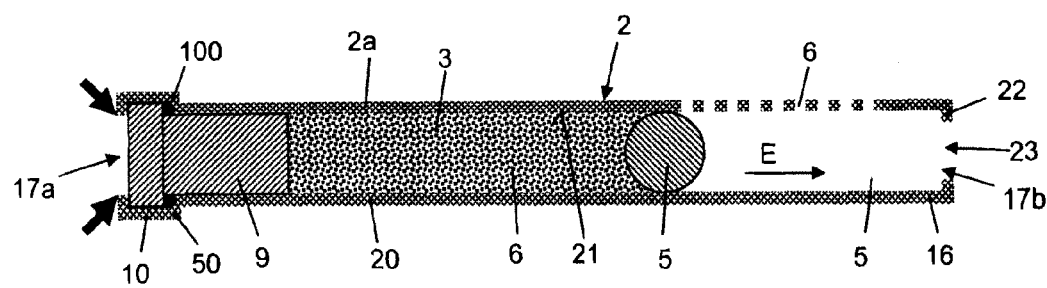

Afterwards, according to FIG. 15, coolant 3 is filled into the reservoir 2 through the opening 17a of the free end 10 of the first portion 4 of the reservoir 2, and hereafter, according to FIG. 16, a movement generating device 9 is inserted along the later movement direction E, which comprises a broadened end region that rests along the movement direction E via a sealing 100 annularly circulating along the step 50 on said step 50. In this connection, said sealing 100 comprises a side via which the sealing 100 butts against the circulating step 50 as well as a side facing away from this circulating side via which the sealing 100 butts against the broadened region of the movement generating device 9. In order to fix the movement generating device 9 in the free end 10 of the first portion 4 of the reservoir 2 and thereby, at the same time, pretension the movement generating device 9 against the sealing 100, the free end 10 is clamped with the broadened region of the movement generating device 9 (by means of flanging/crimping), so that a circulating boundary of the free end 10 engages behind the broadened region of the movement generating device 9, so that the movement generating device 9 is held counter to and along the movement direction E of the closure element 7 in the free end 10 of the first portion 4 of the reservoir (tube) 2a (cf. FIG. 17).

Figure 18:
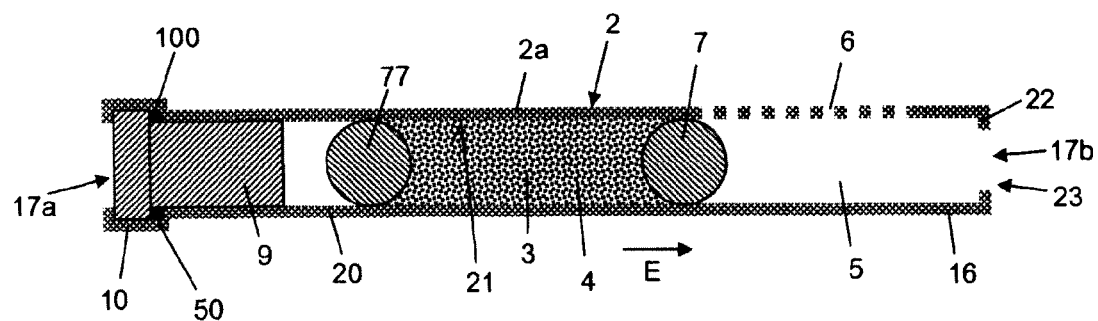
FIG. 18 shows a modification of the reservoir of an airbag module according to the invention shown in FIG. 1.

FIG. 18 shows on the basis of a schematical cross sectional view a modification of the reservoir 2 of an airbag module according to the invention shown in FIG. 1, in case of which, in contrast to FIG. 1, a further closure means 77 in the form of a sphere is provided (the further closure means 77 can also have one of the other afore-described shapes and properties).

The further closure means 77 is thereby arranged such in the first portion 4 of the reservoir 2, that the coolant 3 is enclosed along the movement direction E between the two closure means 7, 77.

Particularly, the further closure means 77 is thus arranged along the movement direction E between the movement generating device 9 and the coolant 3 and therefore functions as a piston for pressing out the coolant 3 out of the reservoir 2.

Namely, in case the movement generating device 9 acts on the further closure means 77 with a pressure, the further closure means 77 is pressed towards the outflow openings 6 out of its initial position, wherein it takes along the coolant 3, which on his part takes along the one closure means 7 and moves it past the outflow openings 6, so that it butts against the front face 22 of the reservoir 2. Now, the pressurized further closure means 77 presses the coolant through the outflow openings 6 out of the reservoir 2.

The closure means 77 arranged adjacent the free end 10 of the first portion 4 also comprises, besides sealing upon activation of the cooling device 2, 3, 9, 7, 77, the function of a piston that presses the coolant 3 out of the outflow openings 6 of the reservoir 2. The additional closure element 77 thus separates upon ignition of the movement generating device 9 (gas generator) the arising gases from the coolant 3 that can directly develop its cooling effect in this way, which becomes noticeable in significantly shorter times until a certain pressure decrease is noticeable in the gas sack. Without this further closure element 77 a mixing of gases of the movement generating device 9 with the coolant 3 delaying the pressure decrease occurs.

Figure 19:
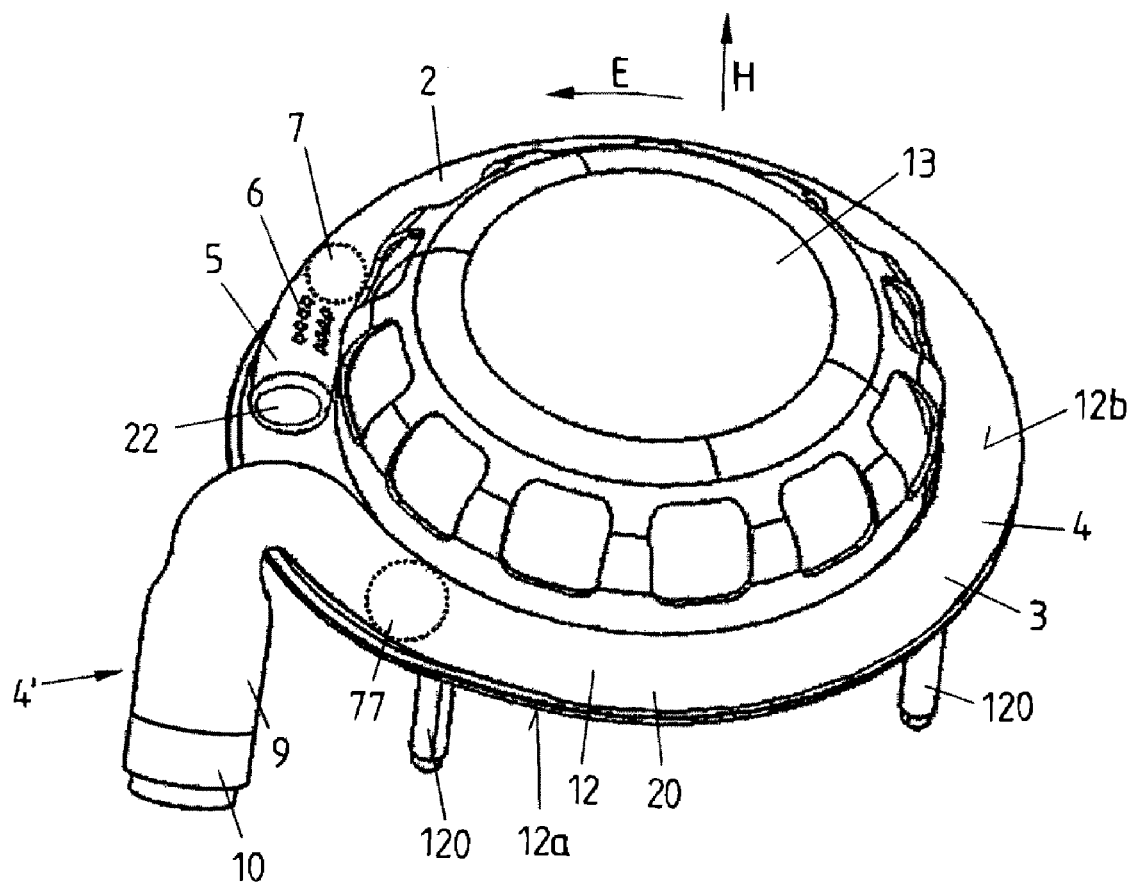
FIG. 19 shows a modification of the reservoir shown in FIG. 6.

Finally, FIG. 19 shows a modification of the airbag module shown in FIG. 6, wherein in contrast to FIG. 6 the reservoir 2 comprises a curvature (bending) in the first portion 4, so that a portion 4' of the reservoir 2, that comprises the free end 10 of the first portion 4 of the reservoir 2 and the movement generating device 9, protrudes out of the gas sack 1. The curvature is designed such that the portion 4' of the reservoir 2 runs parallel to the bolts 120 or perpendicular to the lower side 12a of the flange 12. Or in other words, said portion 4' of the reservoir 2 extends along the main unfolding direction H.

The reservoir 2, in contrast to FIG. 6, is designed according to FIG. 18, i.e., the coolant 3 is, as described above, enclosed between the closure means 7, 77. In contrast to FIG. 18, the reservoir 2 is bent according to FIG. 19 and extends (circulates) along the flange 12, wherein the second portion 5 extends along the flange 12. Also the part of the first portion 4 that contains the coolant 3—which is caged between the closure elements 7, 77—extends along the flange 12. Hereof, said portion 4' comes off that protrudes out of the gas sack 1.

The gas sack 1 is not shown in FIG. 19. In this respect it is referred to FIG. 6.

The priority applications, German Patent Applications No. 10 2008 036 515.7, filed Aug. 6, 2008, and No. 10 2008 056 948.8, filed Nov. 7, 2008 including the specifications, drawings, claims and abstracts, are incorporated herein by reference in their entirety, respectively.

Given the disclosure of the present invention, one versed in the art would appreciate that there may be other embodiments and modifications within the scope and spirit of the invention. Accordingly, all modifications attainable by one versed from the present disclosure within the scope and spirit of the present invention are to be included as further embodiments of the present invention. The scope of the present invention is to be defined as set forth in the following claims.

The invention claimed is:

1. An airbag module for a motor vehicle, comprising:
a gas sack, that can be inflated in order to protect a person by feeding gas into the gas sack;
an openable reservoir for storing a coolant, wherein the reservoir comprises a first and a second portion, the second portion connected to the first portion;
at least one outflow opening of the reservoir formed in the second portion, through which the coolant, for cooling the gas fed into the gas sack, can leave the reservoir;
a closure element for preventing the coolant from escaping the reservoir, wherein the closure element divides the reservoir into the two portions, and in that the coolant is arranged in the first portion, wherein the closure element seals the first portion of the reservoir with respect to the second portion of the reservoir, and wherein the closure element can be moved along a movement direction out of an initial position in which the closure element divides the reservoir into the two portions into a final position in which the coolant can leave the reservoir from the first section via the second section through the at least one outflow opening; and
a movement generating device that is configured and provided to act on the coolant with a pressure, so that the coolant presses the closure element out of the initial position into the final position.

2. The airbag module as claimed in claim 1, wherein the closure element is movable in the reservoir in order to allow the coolant to escape out of the reservoir and is also arranged in the reservoir after said movement.

3. The airbag module as claimed in claim 1, wherein the reservoir comprises a wall extending longitudinally along the movement direction, that circulates across the movement direction, wherein said wall is particularly formed hollow-cylindrical at least in sections.

4. The airbag module as claimed in claim 3, wherein the outflow opening is formed at the wall, so that the coolant is discharged out of the reservoir through said outflow opening across the movement direction.

5. The airbag module as claimed in claim 1, wherein the closure element is formed deformable, particularly elastically deformable.

6. The airbag module as claimed in claim 1, wherein the movement generating device is formed by a gas generator that is particularly crimped with a free end of the first portion of the reservoir.

7. The airbag module as claimed in claim 1, wherein the reservoir is formed tubular.

8. The airbag module as claimed in claim 1, wherein the reservoir is arranged at a retaining element of the airbag module, that serves for fastening the gas sack in the airbag module, wherein the reservoir is particularly integrated into the retaining element.

9. The airbag module as claimed in claim 8, wherein the reservoir is arranged at a flange of the retaining element of the airbag module, particularly integrated into the flange.

10. The airbag module as claimed in claim 1, wherein the reservoir is angled in a way that the reservoir protrudes, with a portion that comprises the movement generating device in particular, out of the gas sack, wherein said portion extends in particular perpendicular to the flange.

11. An airbag module for a motor vehicle, comprising:
a gas sack, that can be inflated in order to protect a person by feeding gas into the gas sack;
an openable reservoir for storing a coolant, wherein the reservoir comprises a first and a second portion, the second portion connected to the first portion;
at least one outflow opening of the reservoir formed in the second portion, through which the coolant, for cooling the gas fed into the gas sack, can leave the reservoir; and
a closure element for preventing the coolant from escaping the reservoir;
wherein the closure element divides the reservoir into the two portions, and in that the coolant is arranged in the first portion, wherein the closure element seals the first portion of the reservoir with respect to the second portion of the reservoir, and
wherein a further closure element is provided, that can be moved out of an initial position, in which the further closure element is arranged such that the coolant is enclosed between the two closure means, into in a final position, wherein the further closure means, upon its movement into its final position, takes along the coolant and the one closure means in order to set free the coolant.

12. The airbag module as claimed in claim 11, wherein a movement generating device is configured and provided to act on the coolant with a pressure via the further closure means, so that the further closure means presses the coolant out of the reservoir and thereby presses the one closure element out of its initial position into its final position.

13. A method for producing an airbag module, comprising the steps of:
providing a tube extending longitudinally along an extension direction, that is divided into a first and a second portion along the extension direction;
forming at least one outflow opening merely at the second portion; and
inserting a closure element into the tube, so that the closure element divides the tube into the first and the second portion,
wherein a further closure means is inserted into the first portion, particularly through an opening of the first portion, which is delimited by a free end of the first portion, so that the two closure means enclose a coolant, and
wherein, as the closure element, a deformable, particularly elastically deformable element is inserted into the tube, that seals the first portion with respect to the second portion, so that coolant residing in the first portion cannot escape through the at least one outflow opening formed at the second portion.

14. The method as claimed in claim 13, wherein a free end of the second portion that faces the free end of the first portion along the extension direction, is narrowed, in order to avoid that the closure element can be pressed out of the tube along the extension direction.

15. The method as claimed in claim 14, wherein a movement generating device is inserted into the first portion of the tube, particularly through said free end of the first portion, wherein particularly the movement generating device is fastened to said first portion after insertion into the first portion.

16. The method as claimed in claim 13, wherein the coolant is filled in the first portion, particularly through the opening of the first portion.

* * * * *